Dec. 18, 1928.  1,695,728
A. T. DAWSON ET AL
ORDNANCE BREECH MECHANISM
Filed Sept. 3, 1926   5 Sheets-Sheet 1

INVENTORS
Arthur Trevor Dawson,
George Thomas Buckham,
by Bright & Bailey
Attys

Dec. 18, 1928.  1,695,728
A. T. DAWSON ET AL
ORDNANCE BREECH MECHANISM
Filed Sept. 3, 1926  5 Sheets-Sheet 2
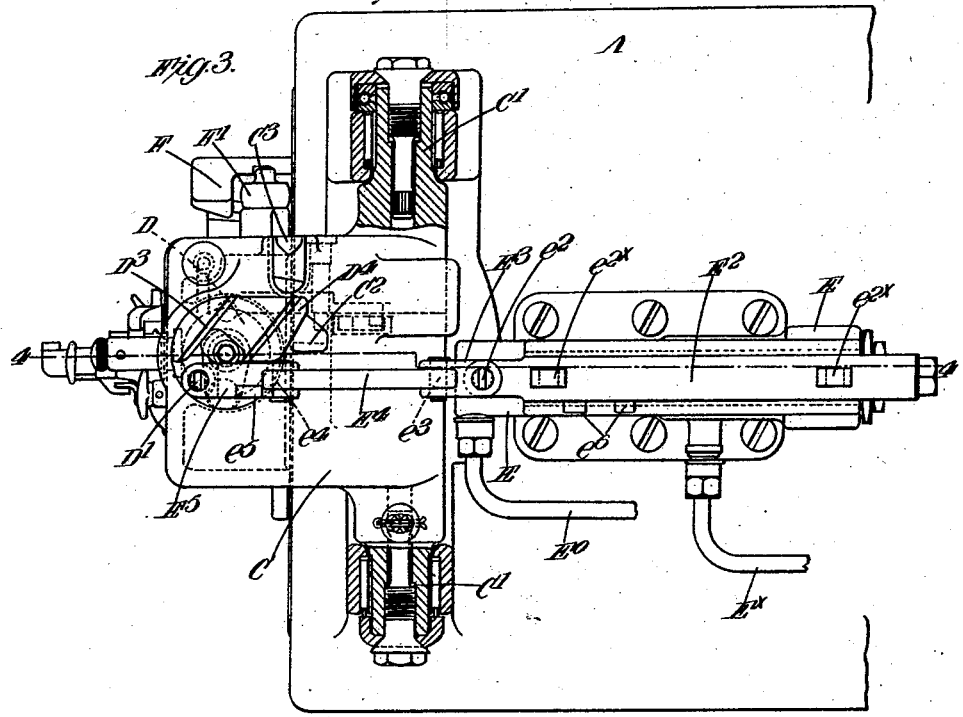
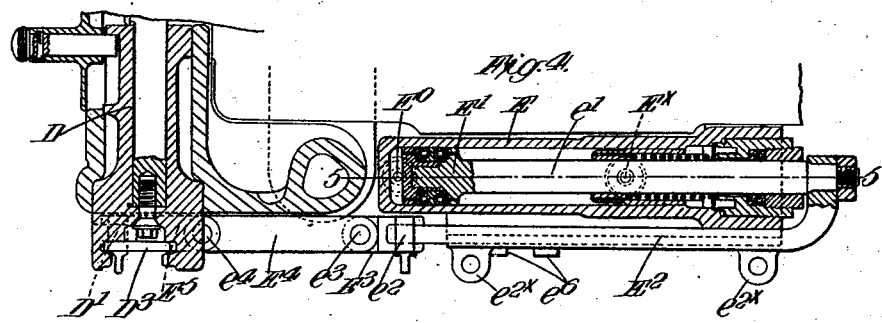
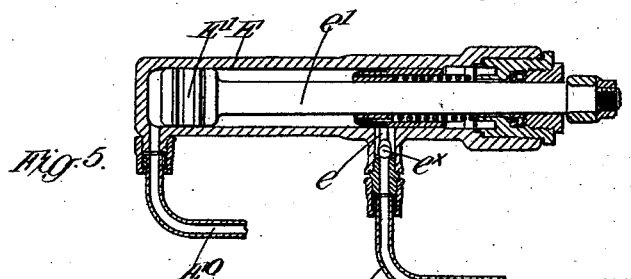
INVENTORS
Arthur Trevor Dawson,
George Thomas Buckham,
by Bright & Bailey
ATT'YS Dec. 18, 1928.
A. T. DAWSON ET AL
1,695,728
ORDNANCE BREECH MECHANISM
Filed Sept. 3, 1926    5 Sheets-Sheet 3
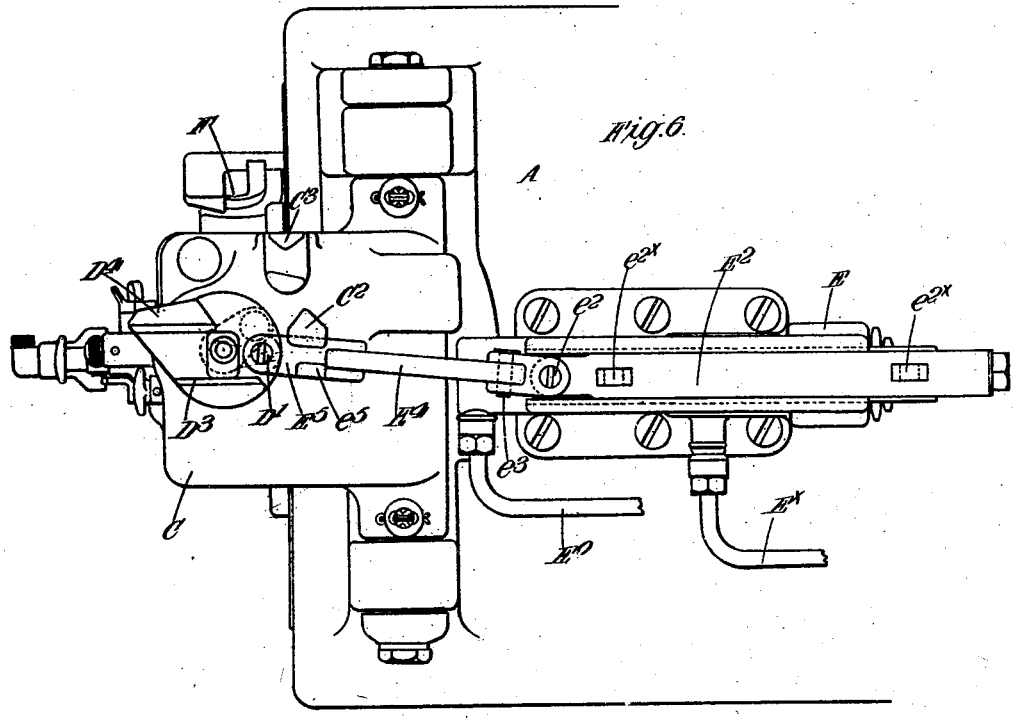
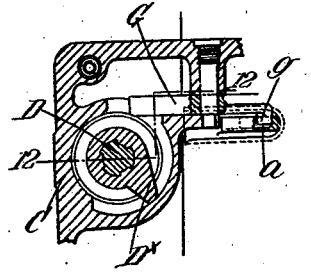
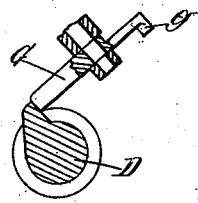
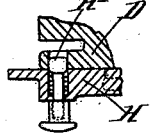
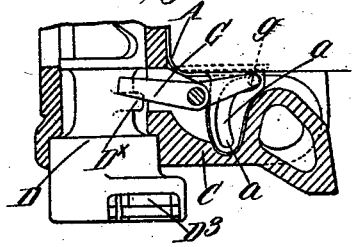
INVENTORS
Arthur Trevor Dawson,
George Thomas Buckham, Dec. 18, 1928.  A. T. DAWSON ET AL  1,695,728

ORDNANCE BREECH MECHANISM

Filed Sept. 3, 1926   5 Sheets-Sheet 5

INVENTORS
Arthur Trevor Dawson,
George Thomas Buckham,
by Bright & Bailey
ATTYS.

Patented Dec. 18, 1928.

1,695,728

UNITED STATES PATENT OFFICE.

ARTHUR TREVOR DAWSON AND GEORGE THOMAS BUCKHAM, OF WESTMINSTER, LONDON, ENGLAND, ASSIGNORS TO UNITED STATES ORDNANCE COMPANY, OF WASHINGTON, DISTRICT OF COLUMBIA, A CORPORATION OF VIRGINIA.

ORDNANCE-BREECH MECHANISM.

Application filed September 3, 1926, Serial No. 133,402, and in Great Britain September 15, 1925.

This invention relates to power-operated ordnance breech mechanism of the swinging carrier type and of the kind having a single pressure fluid operating device of the cylinder and piston or ram type for effecting the angular unlocking displacement of the breech screw, the opening movement of the carrier, the closing movement of the carrier and the angular locking displacement of the breech screw, a cam device being provided between the breech screw and the gun so that the angular unlocking displacement of the breech screw initiates the opening movement of the carrier and the final portion of the closing movement of the carrier initiates the angular locking displacement of the breech screw.

According to the invention the aforesaid cylinder is attached longitudinally to the gun on the same side as, and in front of, the carrier hinge pin or spigot and the piston rod is connected through a swinging link mechanism to a crank pin on a transverse breech screw operating shaft mounted in the carrier. The said swinging link mechanism includes a short link connected to the aforesaid crank pin and this link during the unlocking displacement of the breech screw moves behind a projection on the carrier and eventually comes against a stop which may be constituted by the said projection; the engagement of this link with the projection when the breech screw is unlocked enables the continued movement of the piston rod to swing the carrier to the open position, the link remaining in operative engagement with the projection during the whole of the swinging-out movement of the carrier. As the said projection does not operate to prevent angular displacement of the breech screw towards its locking position during the swinging movements of the carrier, we provide a latch or catch which, when the breech screw is fully unlocked, co-operates with an arm or projection moving with the aforesaid operating crank shaft and remains in co-operation therewith during the swinging movements of the carrier so as to prevent the said angular displacement of the breech screw. This latch is moved into and out of its operative position at the correct times in relation to the operations of the aforesaid cam device, by a cam groove formed in a bracket projecting from the breech end of the gun, a roller or pin on one arm of the latch engaging in this cam groove. Undue pressure on this latch during the closing movement of the carrier is avoided by arranging that the aforesaid crank pin is nearly at its dead centre position when the breech screw is fully unlocked so that the latch has only to retain the crank pin in this position until the cam groove moves the latch to the releasing position as the aforesaid cam device comes into operation to initiate the angular locking displacement of the breech screw, this displacement being completed by the movement of the piston rod under the influence of the pressure fluid. The aforesaid swinging link mechanism comprises in addition to the short link referred to above a longer link connected at its rear end to the front end of the short link by a vertical pivot pin and connected at its front end to the rear end of a second short link by a second vertical pivot pin. The front end of this second short link is connected by a horizontal pivot pin to the rear end of a bar sliding in guides on the aforesaid cylinder. This bar extends to the front of the cylinder where it is connected to the piston rod which projects through the front end of the cylinder. The said arrangement of links provides the necessary universal joint connections to accommodate movements of the crank pin of the operating crank shaft and the swinging movements of the carrier. As the cylinder occupies a fixed position on the side of the gun the pressure fluid connections thereto are of a simple character in comparison with the swivelling connections necessary in those constructions in which a pivoted cylinder is employed.

For hand operation of the breech mechanism the aforesaid swinging link mechanism is uncoupled from the operating crank shaft and a hand lever is attached to the outer end of the operating crank shaft by means of guides provided on the latter and is secured in position by a spring plunger which engages in the hole previously occupied by the crank pin by which the first of the aforesaid short links was connected to the operating crank shaft. This arrangement prevents the power gear and the hand lever from being coupled to the operating crank shaft at the same time.

In order that the said invention may be clearly understood and readily carried into effect, the same will now be described more fully with reference to the accompanying drawings, in which:—

Figure 1:
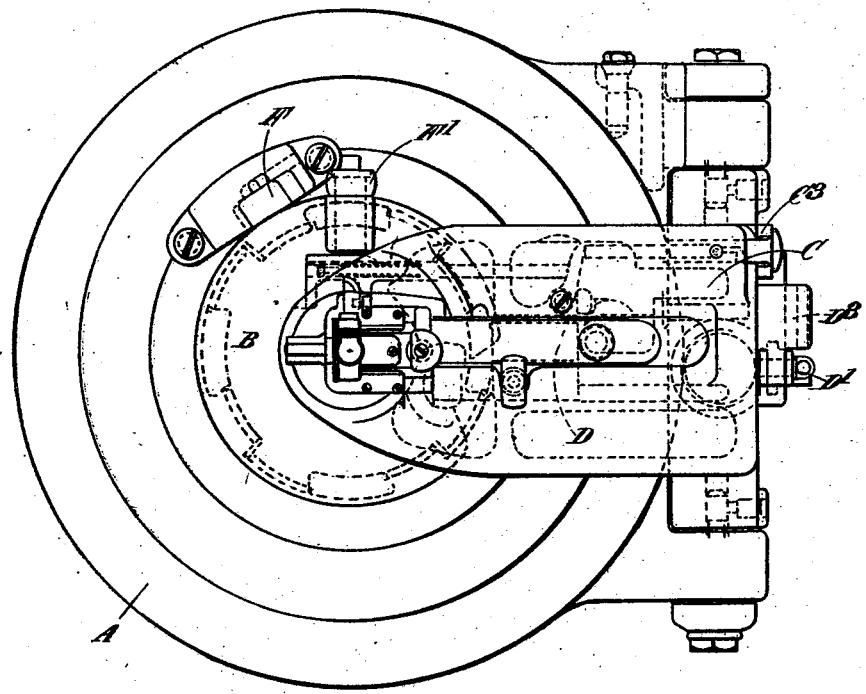
Figure 1 is a rear elevation of a gun provided with breech mechanism in accordance with this invention, the breech mechanism being in the closed position.
Figure 2:
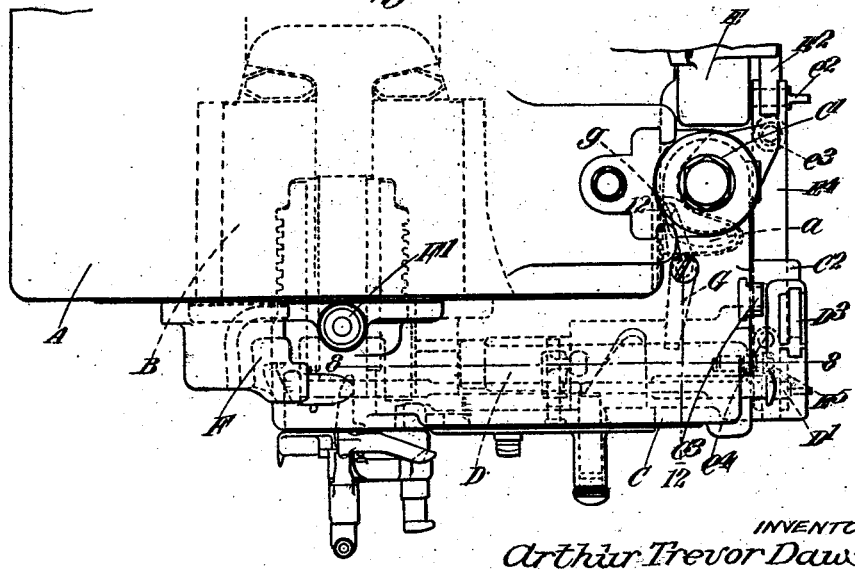
Figure 2 is a plan of Figure 1.
Figure 7:
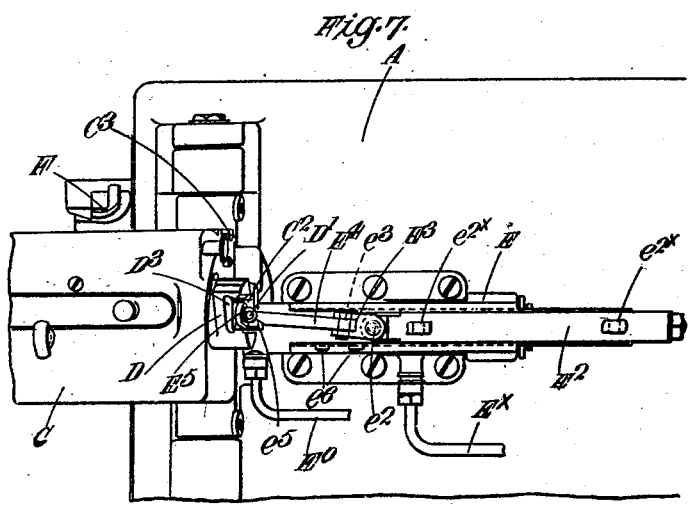
Figure 8:
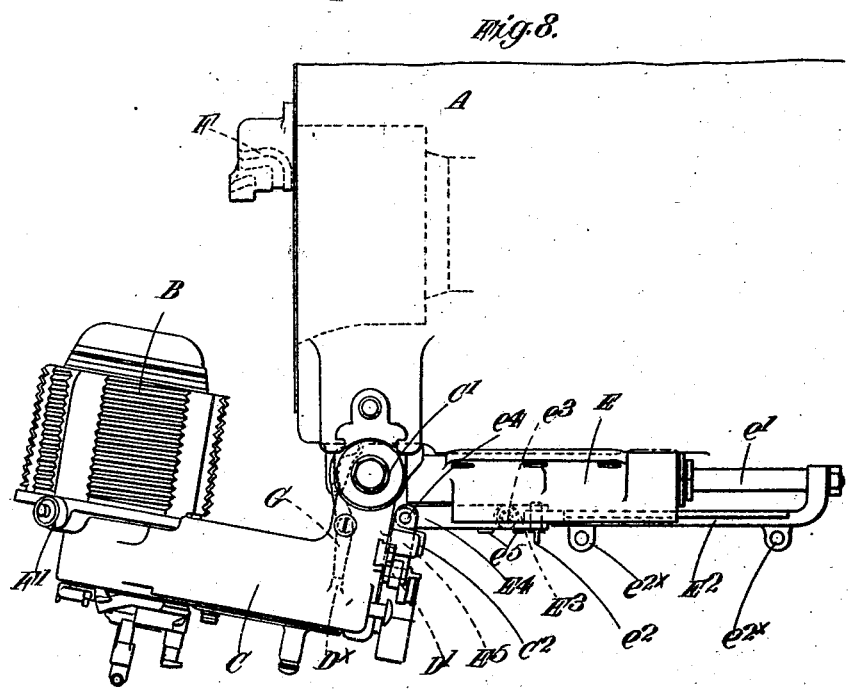
Figure 9:
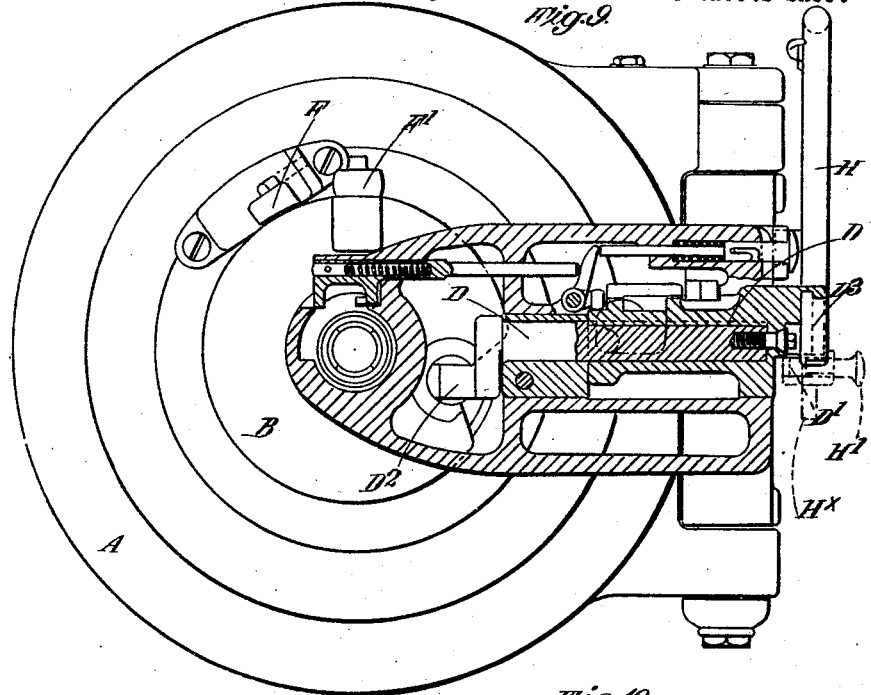
Figure 10:
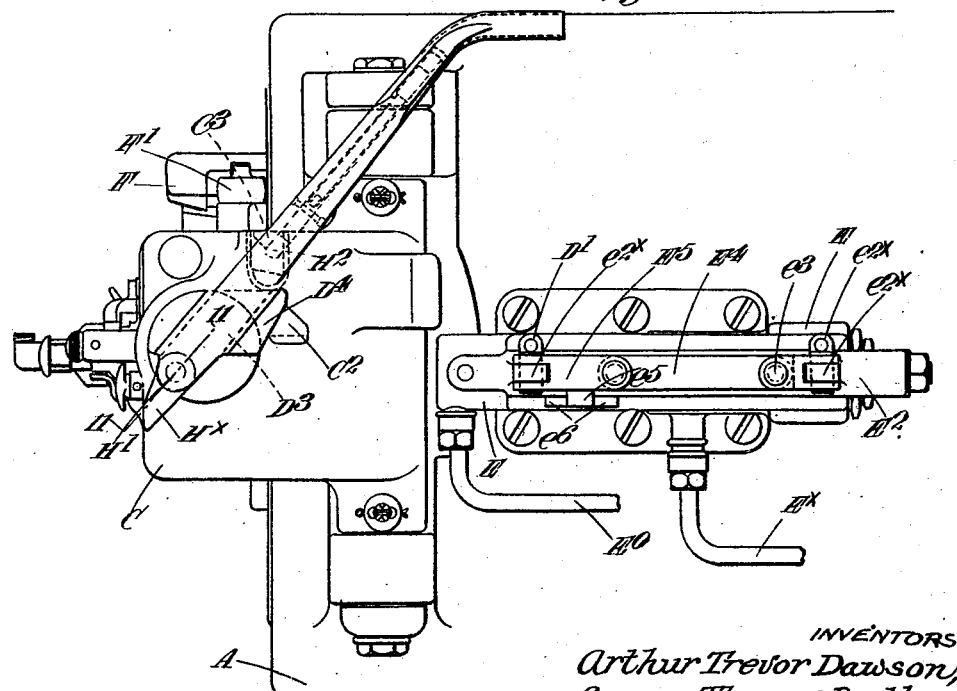

Figure 3 is a sectional side elevation of Figure 1 viewed from the right hand side of the latter figure, Figure 4 is a section taken approximately on the line 4, 4 of Figure 3, Figure 5 is a section taken approximately on the line 5, 5 of Figure 4, Figure 6 is a view similar to Figure 3 shewing the position of the parts when the breech screw is unlocked and before the carrier is swung out, it being assumed for the purpose of illustrating the parts more clearly that the carrier has not received the usual small opening movement under the influence of the aforesaid cam device, Figure 7 is a view similar to Figure 3 shewing the breech mechanism in the fully open position, this figure being drawn on a smaller scale than Figures 1 to 6, Figure 8 is a plan of Figure 7, Figure 9 is a view similar to Figure 1 but with parts in section on the line 9, 9 of Figure 2, Figure 10 is a side elevation of Figure 9 viewed from the right, Figures 9 and 10 shewing the parts in condition for hand operation of the breech mechanism, Figure 11 is a section taken approximately on the line 11, 11 of Figure 10.

Figure 12 is a section taken approximately on the line 12, 12 of Figure 11,

Figure 13 is a section taken approximately on the line 13, 13 of Figure 12,

Figure 14 is a view similar to Figure 13 but shewing the parts in the position they occupy when the breech screw is unlocked and the breech mechanism is swinging out, and Figure 15 is a local section taken on the line 15, 15 of Figure 14.

A is the breech ring of the gun, B the breech screw, C the carrier and $C^1$ the hinge spigot of the said carrier. D is the transverse operating crank shaft mounted in the carrier. $D^1$ is the crank pin on the outer end of this operating crank shaft. $D^2$ is the breech screw actuating crank pin on the inner end of the said shaft, the latter pin serving to operate the breech screw in a similar manner to that described and shown in the specification and drawings of British Patent No. 6739 of 1912.

E is the operating cylinder and $E^1$ is the piston disposed in this cylinder, the said cylinder being attached longitudinally to the gun at the same side as and slightly in front of the carrier hinge spigot and the rod $e^1$ of the piston $E^1$ projecting through the front end of the cylinder where it is connected to the front end of a bar $E^2$ sliding in guides on the cylinder E. The rear end of the said bar is connected by a horizontal pivot pin $e^2$ to a short link $E^3$ which is connected by a vertical pivot pin $e^3$ to a longer link $E^4$. The latter link is connected by a vertical pivot pin $e^4$ to another short link $E^5$, the rear end of which engages with the aforesaid crank pin $D^1$ on the outer end of the transverse operating crank shaft D. This arrangement of links provides the necessary universal joint connections to accommodate the angular movements of the crank pin $D^1$ and the swinging movements of the carrier C during the operation of the breech mechanism. $C^2$ is the aforesaid projection on the carrier this projection having a recess into which the short link $E^5$ moves during the unlocking displacement of the breech screw as shewn in Figure 6 so that after the aforesaid cam device (indicated at F, $F^1$) has come into operation to initiate the swinging-out movement of the carrier, the continued pull on the links by the forward movement of the piston $E^1$ completes the swinging-out movement of the carrier through the intermediary of the link $E^5$ and the stop $C^2$. The fully swung-out position of the breech mechanism is shown by Figures 7 and 8. The swinging-in movement of the carrier is effected by the rearward movement of the piston $E^1$, which movement is transmitted to the carrier by means of the link $E^5$ which at this time bears against the inner wall of the recess in the projection $C^2$ and this position is maintained until the breech screw commences to move to its locking position under the influence of the aforesaid cam device F, $F^1$. As the said projection $C^2$ does not operate to prevent angular displacement of the breech screw towards its locking position during the swinging movements of the carrier a latch or catch G is provided for co-operating with an arm or projection $D^x$ moving with the operating crank shaft D during the swinging movements of the carrier so as to prevent the said angular displacement of the breech screw. This latch or catch is moved into and out of its operative position at the correct times in relation to the operations of the cam device F, $F^1$ by means of a cam groove $a$ formed in a bracket projecting from the breech end of the gun between the hinge lugs thereon, a roller or pin $g$ on the said latch or catch engaging in this cam groove. This operation will be clearly understood from Figures 12 to 15. As aforesaid the crank pin $D^1$ is arranged to be nearly at its dead centre position when the breech screw is fully unlocked as is shewn in Figure 6.

The cylinder E and its associated parts are shewn as being constructed generally in the manner described in the specification of prior British Patent No. 205522 with reference to the carrier-swinging cylinder, except that the port $e$ through which the pressure fluid enters the cylinder to effect the closing movement of the breech mechanism is formed in the cylinder wall, this port being provided with a ball throttle valve $e^x$ as described in the said prior specification. It will be seen that as the cylinder occupies a fixed position on the gun the pressure fluid connections $E^x$, $E^o$ are of a simple character in comparison with the swivelling connections necessary in those constructions in which a pivoted cylinder is employed.

For hand operation of the breech mechanism the aforesaid crank pin $D^1$ is removed as is also the aforesaid horizontal pivot pin $e^2$ and the unit composed of the links $E^3$, $E^4$ and $E^5$ is connected to the sliding bar $E^2$ by means of lugs $e^{2x}$, $e^{2x}$ on the side thereof through which lugs and through the holes in the links $E^3$, $E^5$ the pins $e^2$ and $D^1$ are passed as shewn in Figure 10, it being understood that to effect this connection the unit composed of the said links is moved about its longitudinal axis through a right angle. In the position shewn by Figure 10 a projection $e^5$ on the link $E^5$ engages between two lugs $e^6$, $e^6$ on the cylinder E and thereby locks the piston $E^1$ to the cylinder. A handlever H is then inserted in an undercut guide $D^3$ in the outer end of the operating crank shaft D and is secured in position by means of a spring plunger $H^1$ which engages in the hole previously occupied by the crank pin $D^1$, this arrangement preventing the power gear and the handlever from being coupled to the operating crank shaft D at the same time. The said handlever is fitted with a spring-controlled catch $H^2$ which engages with a stop $C^3$ on the carrier and retains the handlever in the locked position until released by the hand when the handle of the said handlever is grasped in order to open the breech mechanism, it being seen from Figures 9 and 10 that this catch is moved downwards by downward movement of the hand upon the said handle. A part $D^4$ of the guide $D^3$ co-operates with the aforesaid stop $C^2$ to limit the locking movement of the shaft D whether the latter is being operated by power or by the handlever H and the latter has a projection $H^x$ which when the breech mechanism is being operated by hand comes against the stop $C^2$ and thereby limits the unlocking movement of the breech screw.

What we claim and desire to secure by Letters Patent of the United States is:—

1. In power-operated breech mechanism for guns, a hinged carrier, a breech screw mounted on the carrier, a transverse breech screw operating shaft mounted in the carrier, a cylinder and piston attached longitudinally to the gun on the same side as and forward of the carrier hinge, a crank pin on said shaft, and a swinging link mechanism through which the piston rod of said piston is connected to the crank pin.

2. In power operated breech mechanism for guns, a hinged carrier, a breech screw mounted on the carrier, a transverse breech screw operating shaft mounted in the carrier, a cylinder and piston attached longitudinally to the gun on the same side as and forward of the carrier hinge, a crank pin on said shaft, a projection on the carrier, and a swinging link mechanism through which the piston rod of said piston is connected to the crank pin, said swinging link mechanism including a short link connected to the crank pin and moving behind the projection on the carrier during unlocking displacement of the breech screw whereby said short link, during further breech opening movement of said piston, will act against said projection to swing the carrier to open position.

3. In breech mechanism for guns, a hinged carrier, a breech screw mounted on the carrier, a transverse breech screw operating shaft mounted in the carrier, means for rotating such shaft and swinging the carrier, and a movable latch on the carrier coacting, when the breech screw is fully unlocked with a projection on the shaft to prevent angular displacement of the breech screw during swinging movements of the carrier.

4. Ordnance breech mechanism as in claim 3, wherein the latch is moved into and out of coacting relation with the projection on the breech screw operating shaft at the correct times by a cam groove formed in a bracket on the breech end of the gun.

5. Ordnance breech mechanism as in claim 3, wherein the crank pin on the breech screw operating crank shaft is arranged to be nearly at its dead center position when the breech screw is fully unlocked, for the purpose specified.

6. Ordnance breech mechanism as in claim 2 wherein the link mechanism comprises in addition to the short link two other links interposed between the said short link and a sliding bar which extends to the front of the operating cylinder where it is connected to the piston rod which projects through the front end of the said cylinder, substantially as described.

7. Ordnance breech mechanism as in claim 1, wherein for hand operation of the breech mechanism the swinging link mechanism is uncoupled from the breech screw operating crank shaft and a hand lever is attached to the outer end of said shaft and is secured in position by a spring plunger which engages in the hole previously occupied by the crank pin connecting the link mechanism to the said shaft, for the purpose specified.

ARTHUR TREVOR DAWSON.
GEORGE THOMAS BUCKHAM.